US012670355B2

(12) United States Patent (10) Patent No.: US 12,670,355 B2
Odaka (45) Date of Patent: Jun. 30, 2026

(54) SMART CARD

(71) Applicant: DEXERIALS CORPORATION, Tochigi (JP)

(72) Inventor: Ryosuke Odaka, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 0 days.

(21) Appl. No.: 19/100,125

(22) PCT Filed: Jun. 29, 2023

(86) PCT No.: PCT/JP2023/024231
§ 371 (c)(1),
(2) Date: Jan. 31, 2025

(87) PCT Pub. No.: WO2024/029250
PCT Pub. Date: Feb. 8, 2024

(65) Prior Publication Data
US 2026/0044703 A1 Feb. 12, 2026

(30) Foreign Application Priority Data

Aug. 4, 2022 (JP) ................................. 2022-125002

(51) Int. Cl.
*G06K 19/077* (2006.01)
*B42D 25/20* (2014.01)
*B42D 25/40* (2014.01)

(52) U.S. Cl.
CPC ......... *G06K 19/0775* (2013.01); *B42D 25/20* (2014.10); *B42D 25/40* (2014.10); *G06K 19/07779* (2013.01)

(58) Field of Classification Search
None
See application file for complete search history.

(56) References Cited

U.S. PATENT DOCUMENTS

2007/0013396 A1 1/2007 Kim et al.
2015/0237725 A1 8/2015 Yamada et al.
(Continued)

FOREIGN PATENT DOCUMENTS

JP 2003-168097 A 6/2003
JP 2004-013733 A 1/2004
JP 2005-018402 A 1/2005
(Continued)

*Primary Examiner* — Kristy A Haupt
(74) *Attorney, Agent, or Firm* — Paratus Law Group, PLLC

(57) ABSTRACT

Provided is a smart card that can improve the adhesive strength of the IC chip module even under low pressure, and can prevent deformation of the card by increasing the flowability of the conductive adhesive. The smart card includes a card body 2 with an antenna coil 3 built in, and an IC chip module 4 provided with an antenna connection terminal 5 for conductive connection with the antenna coil 3, the IC chip module 4 being housed in an accommodating recess 6 in the card body 2, wherein the antenna coil 3 and the antenna connection terminal 5 are conductively connected via a conductive adhesive 9 in which conductive particles 8 are blended with binder resin 7, and the antenna connection terminal 5 has an opening 10 with a width larger than the average particle diameter of the conductive particles 8.

9 Claims, 15 Drawing Sheets

(56)  References Cited

U.S. PATENT DOCUMENTS

| | | |
|---|---|---|
| 2022/0363953 A1 | 11/2022 | Odaka et al. |
| 2023/0287246 A1 | 9/2023 | Kumakura et al. |

FOREIGN PATENT DOCUMENTS

| | | | | |
|---|---|---|---|---|
| JP | 2015-228234 A | 12/2015 | | |
| JP | 5964187 B2 | 8/2016 | | |
| JP | 2017-117468 A | 6/2017 | | |
| JP | 6966659 B1 | 11/2021 | | |
| WO | WO 2021/246482 A1 | 12/2021 | | |
| WO | WO-2021246484 A1 * | 12/2021 | ....... | G06K 19/07722 |

* cited by examiner

SMART CARD

TECHNICAL FIELD

The present technology relates to a smart card equipped with an IC chip. This application is a National Stage Patent Application of PCT International Patent Application No. PCT/JP2023/024231 (filed on Jun. 29, 2023) under 35 U.S.C. § 371, which claims priority based on Japanese Patent Application No. 2022-125002 (filed on Aug. 4, 2022), the entire contents of which are incorporated by reference herein.

BACKGROUND ART

In recent years, smart cards, which contain an IC chip that can store information, have become widespread. Smart cards are classified into "contact type," "non-contact type," and "contact/non-contact combined type" according to the method of writing and reading data, and the contact/non-contact combined type is also called a dual interface card.

FIG. 15 shows a configuration example of a "contact/non-contact combined type" smart card. The smart card 100 shown in FIG. 15 includes a card body 101 and an IC chip module 102. The card body 101 is formed in a roughly rectangular plate shape, and has an inlay with an antenna coil 105 formed thereon, core sheets laminated to both sides of the inlay, and overlays provided on each surface of the core sheets. In addition, the card body 101 has a chip accommodating recess 106 formed by cutting, in which the IC chip module 102 is housed. The chip accommodating recess 106 exposes two ends 105a, 105b of the antenna coil 105 inside, thereby being conductive with the pair of antenna connection terminals 113a, 113b formed on the IC chip module 102.

FIG. 16 is a cross-sectional view of the IC chip module 102 for both contact and non-contact applications. The contact/non-contact IC chip module 102 has a contact terminal 111 on the front surface of the module substrate 110 and a contact/non-contact IC chip 112 on the back surface opposite the front surface of the module substrate 110, and the IC chip 112 is sealed by encapsulating resin 114. In the IC chip 112, a non-contact interface is connected to the antenna connection terminals 113a, 113b via wires 115, for example. The antenna connection terminals 113a, 113b are provided on the outside of the back surface of the module substrate 110, and when the IC chip module 102 is housed in the chip accommodating recess 106 of the card body 101, it is conductively connected to the both ends 105a, 105b of the antenna coil 105 via the conductive adhesive that fills the chip accommodating recess 106.

Melted metal (solder paste or silver paste) is used as the conductive adhesive that connects the both ends 105a, 105b of the antenna coil 105 to the antenna connection terminal 113, and hot melt adhesive is used in combination as a reinforcing component as appropriate.

CITATION LIST

Patent Literature

Patent Document 1: JP 2017-117468 A
Patent Document 2: JP 5964187 B

SUMMARY OF INVENTION

Technical Problem

The antenna connection terminals 113a, 113b of the IC chip module 102 are made up of a rectangular or other solid metal pattern, and while they have the advantage of being able to improve the connection area with the both ends 105a, 105b of the antenna coil 105 due to their large connection area, the large amount of metal surface facing the conductive adhesive reduces the adhesive force. For this reason, there is a risk that the IC chip module 102 will peel away from the chip accommodating recess 106 when the smart card is bent.

Also, when embedding the IC chip module 102 in the chip accommodating recess 106, the pressure required to flow the softened conductive adhesive becomes high. If this pressure is high, the deformation of the card becomes visually noticeable and undesirable from a quality standpoint.

Therefore, an object of the present technology is to provide a smart card that can improve the adhesive force of the IC chip module even under low pressure, and prevent the deformation of the card by increasing the flowability of the conductive adhesive.

Solution to Problem

In order to solve the above-mentioned problem, a smart card according to the present technology includes: a card body with an antenna coil built in; and an IC chip module provided with an antenna connection terminal for conductive connection with the antenna coil, the IC chip module being housed in an accommodating recess in the card body, wherein the antenna coil and the antenna connection terminal are conductively connected via a conductive adhesive in which conductive particles are blended with binder resin, and the antenna connection terminal has an opening with a width larger than the average particle diameter of the conductive particles.

In addition, a method for manufacturing a smart card according to the present technology includes: a step of preparing a card body with an antenna coil built in, and an IC chip module provided with an antenna connection terminal for conductive connection with the antenna coil, the IC chip module to be housed in an accommodating recess in the card body; a step of housing the IC chip module in the accommodating recess via a conductive adhesive in which conductive particles are blended with binder resin; and a step of heating and pressing the IC chip module to fix the IC chip module in the accommodating recess and conductively connect the antenna coil and the antenna connection terminal, wherein the antenna connection terminal has an opening with a width larger than the average particle diameter of the conductive particles.

Advantageous Effects of Invention

According to the present technology, the adhesive force of the IC chip module can be improved even under low pressure, and the flowability of the conductive adhesive can be increased to prevent deformation of the card.

DESCRIPTION OF EMBODIMENTS

Figure 1:
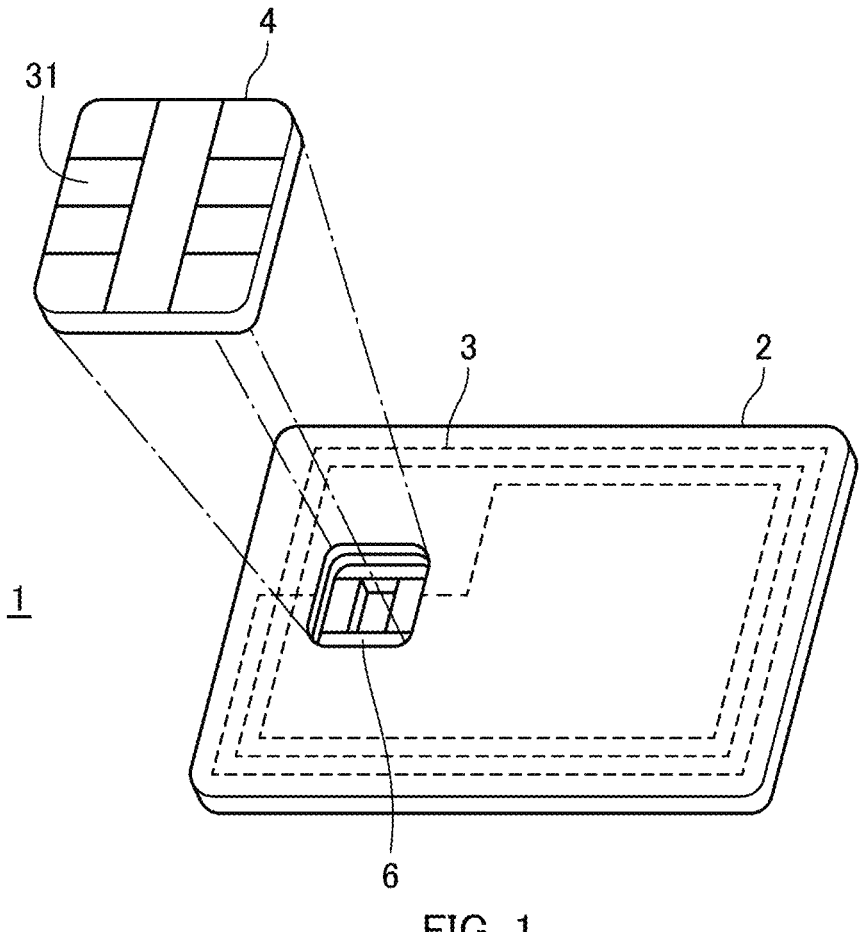
FIG. 1 is a disassembled perspective view of an example of a smart card.

Embodiments of the smart card according to the present technology will now be more particularly described with reference to the accompanying drawings. It should be noted that the present technology is not limited to the embodiments described below and various modifications can be added to the embodiment without departing from the scope of the present technology. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

In this specification, the smart card is a card that incorporates an integrated circuit (IC) for recording and calculating information (data), and is also referred to as an "integrated circuit card" or "chip card". The smart card may be a dual interface card having two interfaces of a contact type and a non-contact type in one IC chip, or a hybrid card with both a contact type IC chip and a non-contact type IC chip. In addition, the smart card may be a fingerprint authentication card having fingerprint authentication elements or a card having a one-time password functions incorporating a battery element and a display element. These IC chips and elements are provided with antenna connection terminals and are electrically connected to the antenna coil functioning as an electrode on the card body side.

Figure 2:
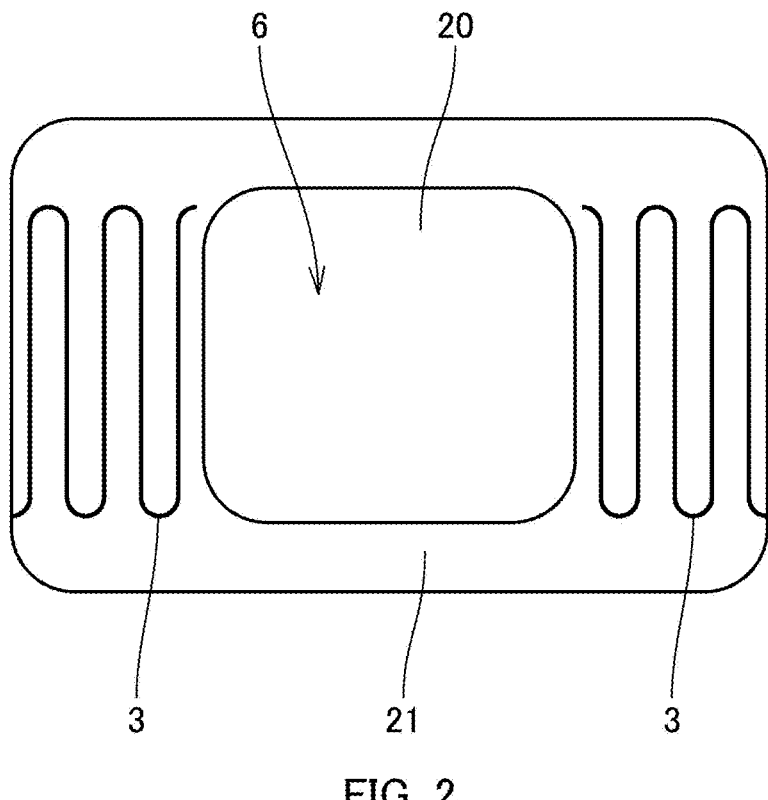
FIG. 2 is a top view of an accommodating recess of the card body.
Figure 3:
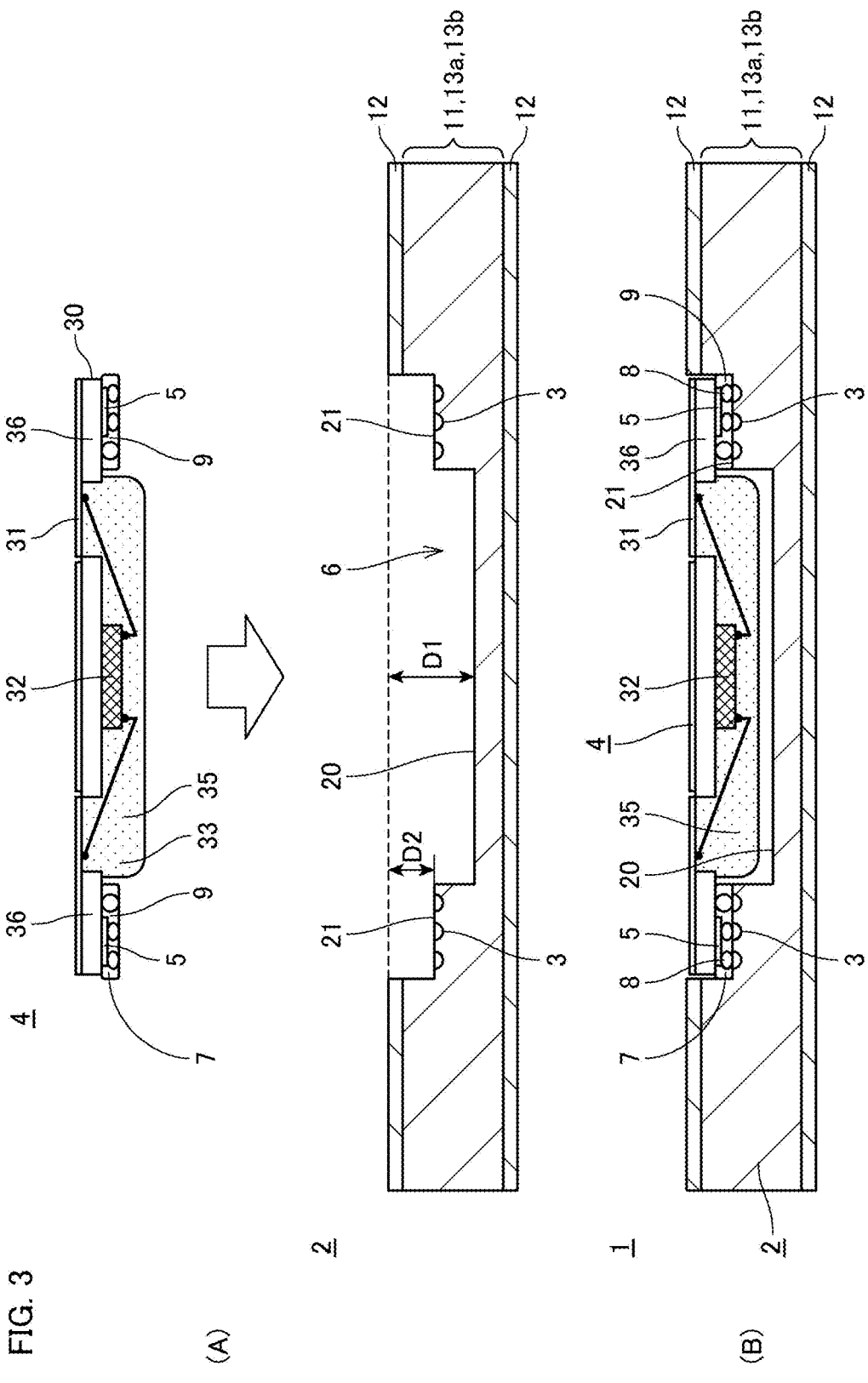
FIG. 3 shows the manufacturing steps for smart card 1, in which view (A) shows the IC chip module before housed in the accommodating recess and view (B) shows the IC chip module housed in the accommodating recess.
Figure 4:
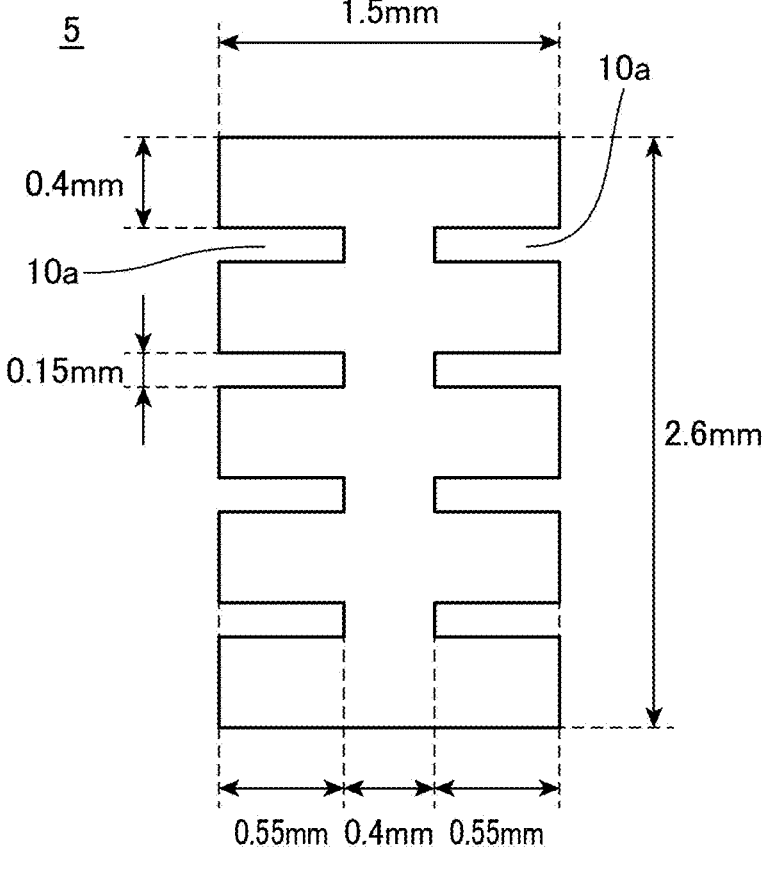
FIG. 4 is a plan view of an example of an antenna connection terminal.

FIG. 1 is a schematic perspective view of an example of a smart card 1 according to the present technology, and FIG. 2 is a plan view of an accommodating recess 6 in a card body 2 that contains an IC chip module 4. FIG. 3 shows manufacturing steps for the smart card 1, and FIG. 4 is a plan view of the antenna connection terminal 5 of the IC chip module 4.

The smart card 1 according to the present technology includes a card body 2 with an antenna coil 3 built in; and an IC chip module 4 provided with an antenna connection terminal 5 for conductive connection with the antenna coil 3, the IC chip module 4 being housed in an accommodating recess 6 in the card body 2, wherein the antenna coil 3 and the antenna connection terminal 5 are conductively connected via a conductive adhesive 9 in which conductive particles 8 are blended with binder resin 7, and the antenna connection terminal 5 has an opening 10 with a width larger than the average particle diameter of the conductive particles 8.

In the smart card 1, the IC chip module 4 is bonded to the accommodating recess 6 of the card body 2 by thermocompression bonding via the conductive adhesive 9, so that the antenna coil 3 exposed to the accommodating recess 6 and the antenna connection terminal 5 provided on the IC chip module 4 are electrically connected via the conductive particles 8. In the smart card 1 according to the present technology, the opening 10 having a width larger than the average particle diameter of the conductive particles 8 is formed in the antenna connection terminal 5, so that the flowability of the binder resin can be improved by thermal compression, and it is not necessary to apply high pressure. Therefore, it is possible to prevent deformation of the card body 2. In addition, the adhesive force can be improved by allowing the binder resin 7 to also flow into the opening 10 provided in the antenna connection terminal 5.

Card Body

The card body 2 is a laminate that includes an inlay 11 provided with the antenna coil 3, first and second core sheets 13a, 13b laminated appropriately on both sides of the inlay 11, and an overlay 12 that constitutes the front and back surfaces of the card body 2. The inlay 11, the first and second core sheets 13a, 13b, and the overlay 12 are made of resin material, for example. Resins that can be used to form the inlay 11, the first and second core sheets 13a, 13b, and the overlay 12 include, e.g., polyvinyl chloride (PVC), polyethylene terephthalate (PET), PET-G, PC (polycarbonate), or recycled materials made from these, and biodegradable plastics such as Ocean Plastic, PLA (polylactic acid), among others. The card body 2 is formed by laminating and integrating the inlay 11, the core sheets 13, and the overlay 12, which constitute each layers, via adhesive or without adhesive by heating and pressing.

Various materials such as thermoplastic or thermosetting materials can be used for the adhesive that bonds the layers of the inlay 11, the first and second core sheets 13a, 13b, and the overlay 12, but those having resistance to the cutting step for the card body 2 and heat resistance to the thermal compression pressure bonding step with the IC chip module 4 are suitable, and thermosetting adhesives are most suitable.

The inlay 11 has the antenna coil 3 formed from a Cu wire and the like that wraps around the outer circumference multiple times. As shown in FIG. 2, part of the antenna coil 3 is exposed to the outside from the accommodating recess 6 formed in the card body 2 and sandwiches the conductive particles 8 of the conductive adhesive 9 with the antenna connection terminal 5 of the IC chip module 4, thereby conductively connected to the antenna connection terminal 5 via the conductive particles 8. There are no particular restrictions on the pattern of the antenna coil 3 at the connection portion to be connected with the antenna connection terminal 5, but from the perspective of securing a large overlapping area with the antenna connection terminal 5, it is preferable to have a pattern with a zigzag shape, as shown in FIG. 2.

In addition, because the inlay 11 holds the conductive particles 8, at least the connection portion of the antenna coil 3 to be connected with the antenna connection terminal 5 is exposed by cutting. The cutting depth is set to a range not exceeding 50% of the antenna coil 3 diameter, preferably a range of 40% or more but less than 50% of the antenna coil 3 diameter, taking into account factors such as preventing the antenna coil 3 from falling off during the cutting process and ensuring sufficient contact area with the conductive particles 8.

Even if the cutting depth is less than 40% of the antenna coil 3 diameter, the trapping and contact area of the conductive particles 8 can be secured by using the conductive adhesive 9 with a predetermined particle area ratio with respect to the overlapping area Y between the antenna coil 3 and the antenna connection terminal 5.

Also, if the overlapping area Y can be secured, it is not necessary to expose all of the antenna coil 3 connected to the antenna connection terminal 5, so that it is also possible to partially expose it. However, in that case, the level difference between the exposed and unexposed parts of the antenna coil 3 must be less than the particle diameter of the conductive particles 8. This prevents the risk of the antenna coil 3 falling off during the cutting process and reducing the overlapping area Y, and the risk of the fallen antenna coil 3 getting caught between another antenna coil 3 and the antenna connection terminal 5, preventing the conductive particles 8 from being sandwiched, among other risks.

The card body 2 has an accommodating recess 6 for housing the IC chip module 4. The accommodating recess 6 is provided with a first recess 20 that accommodates the resin mold portion 35 of the IC chip module 4, and a second recess 21 that is provided on both sides of the first recess 20 and accommodates the terminal portion 36 on which the antenna connection terminal 5 of the IC chip module 4 is formed. The antenna coil 3, which is conductively connected to the antenna connection terminal 5, is exposed in the second recess 21.

As shown in FIG. 3 (A), the first recess 20 has a depth D1 corresponding to the height of the resin mold portion 35 of the IC chip module 4, and the second recess 21 has a depth D2 corresponding to the thickness of the terminal portion 36 of the IC chip module 4 and the adhesive layer formed by the conductive adhesive 9. The depth D2 of the second recess 21 is shallower than the depth D1 of the first recess 20, and the first recess 20 and the second recess 21 are connected in a stair-like manner.

The depth D1 and depth D2 both refer to the distance from the front surface of the card body 2 where the accommodating recess 6 is provided to the bottom surface of each recess. For example, the accommodating recesses 6 can be formed by cutting using a milling machine that is numerically controlled (NC control) by a program.

IC Chip Module

The IC chip module 4 has contact terminals 31 including, e.g., six or eight contact terminals on a front surface of the module substrate 30. The IC chip module 4 also has an IC chip 32 on the back surface opposite the front surface of the module substrate 30, which is used for both contact and non-contact applications, and the IC chip 32 is sealed by encapsulating resin 33, so that a resin mold portion 35 protrudes from the back surface of the module substrate 30. The resin mold portion 35 is embedded in the first recess 20 when the IC chip module 4 is housed in the accommodating recess 6.

The terminal portion 36 with the antenna connection terminal 5 connected to a non-contact interface of the IC chip 32 via, e.g., a wire is provided on both sides of the resin mold portion 35. The terminal portion 36 is embedded in the second recess 21 when the IC chip module 4 is embedded in the accommodating recess 6.

Antenna Connection Terminal

The antenna connection terminal 5 is formed into a predetermined shape by etching, e.g., copper foil and is appropriately nickel-plated or gold-plated, for example. As shown in FIG. 4, the antenna connection terminal 5 of the present technology has an opening 10 with a width larger than the average particle diameter of the conductive particles 8 contained in the conductive adhesive 9.

The opening 10 is formed as a slit 10a extending from the outer edge of the antenna connection terminal 5 inward, or as a hole 10b formed on the inner side of the antenna connection terminal 5. Since the opening 10 has a width larger than the average particle diameter of the conductive particles 8, the conductive particles 8 do not become clogged and the flowability of the binder resin 7 can be improved. Therefore, when connecting the IC chip module 4 via the conductive adhesive 9, the binder resin 7 and the conductive particles 8 can be filled into the second recess 21 without applying high pressure. This prevents deformation of the card body 2. In addition, the binder resin 7 flows into the opening 10, which allows the binder resin 7 to spread throughout the entire second recess 21, thereby improving the adhesive force.

Figure 5:
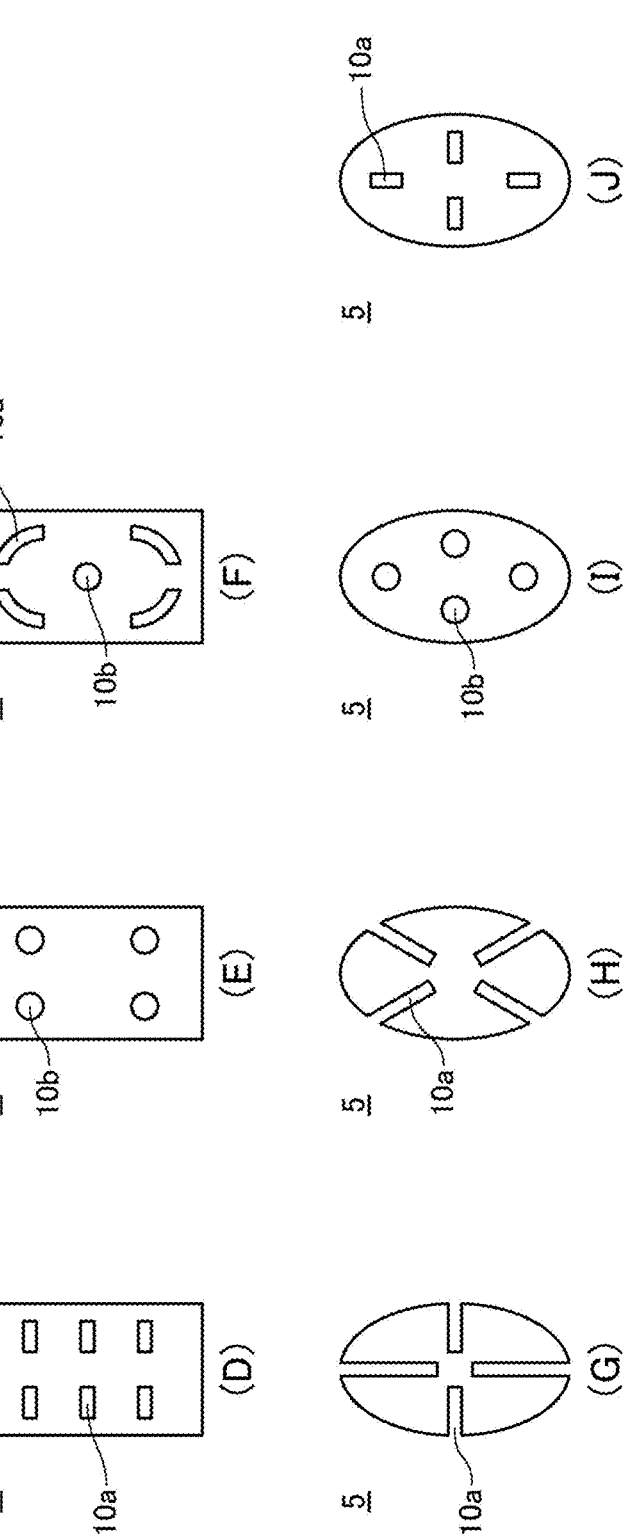
FIG. 5 is a plan view of example patterns of openings provided in the antenna connection terminal.

FIG. 5 shows a plan view of the pattern examples of the opening 10. FIGS. 5 (A) to (C) show pattern examples of openings formed by slits 10a having an open end on the outer edge of the rectangular antenna connection terminal 5, FIGS. 5 (D) to (F) show pattern examples of openings formed by slits 10a and/or holes 10b inside the rectangular antenna connection terminal 5, FIGS. 5 (G) to (H) show pattern examples of openings formed by slits 10a having an open end on the outer edge of an elliptical shape antenna connection terminal, and FIGS. 5 (I) to (J) show pattern examples of openings formed by slits 10a or holes 10b inside an elliptical shape antenna connection terminal.

Figure 6:
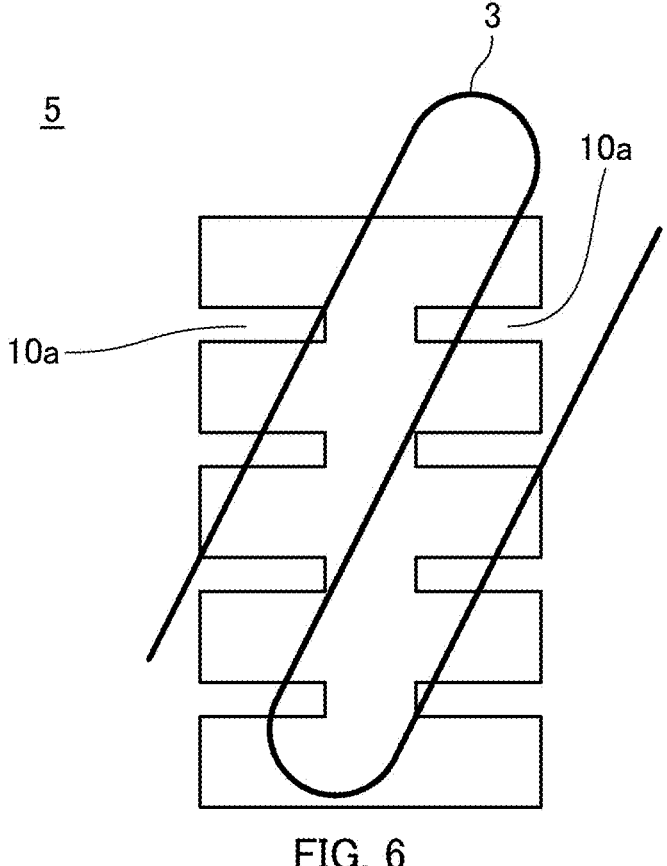
FIG. 6 is a plan view showing a configuration in which the longitudinal direction of the opening provided in the antenna connection terminal is different from the wiring direction in which the antenna coil extends.

As shown in FIG. 6, when the opening 10 is formed as the slits 10a or the holes 10b having a long axis such as a rectangle or an ellipse, it is preferable that the longitudinal direction of the opening 10 is different from the wiring direction in which the antenna coil 3 extends. Since the opening 10 is a part that does not contribute to conductivity with the antenna coil 3 via the conductive particles 8, if the longitudinal direction of the opening 10 is the same as the wiring direction (extension direction) of the antenna coil 3, the opening 10 and the antenna coil 3 may overlap depending on the arrangement, which may reduce the number of trapped conductive particles 8 so that good conductivity may not be ensured. By making the longitudinal direction of the opening 10 different from the wiring direction of the antenna coil 3, even if the antenna coil 3 overlaps with the opening 10, it will only be a partial overlap, and the overlapping area with the antenna connection terminal 5 can be secured.

In addition, it is preferable that the pattern of the opening 10 is a symmetrical pattern in the plan view of the antenna connection terminal 5. This ensures that the heat and pressure applied when connecting to the IC chip module 4 is evenly distributed across the entire antenna connection terminal 5, allowing the binder resin 7 and conductive particles 8 to flow without any bias, and improving the probability of particle trapping of the conductive particles 8.

The width of the opening 10, i.e., the width of the slit 10*a* or the diameter or minor axis of the hole 10*b*, is preferably 100 μm or more, more preferably 150 μm or more. By making the width of the opening 10 at least 100 μm, the flowability will not be impeded even if multiple conductive particles 8 pass through the opening 10, as long as the conductive particles 8 have an average particle diameter used in general conductive adhesives 9. In addition, the width of the opening 10 is preferably 300 μm or less, and more preferably 200 μm or less. If the width of the opening 10 exceeds 300 μm, the area of the antenna connection terminal 5 will decrease relatively, which may impair the conductive connection with the antenna coil 3.

Figure 7:
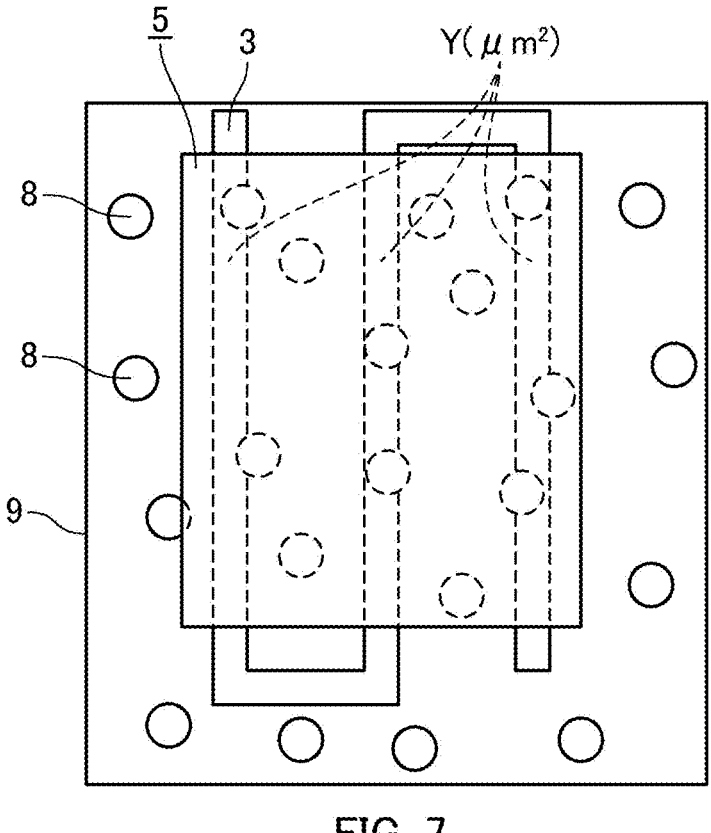
FIG. 7 is a plan view to explain overlapping area Y shared by the antenna connection terminal and the antenna coil and the particle area ratio X, which is the area ratio of the total area of the conductive particles within the area of the conductive adhesive.
Figure 8:
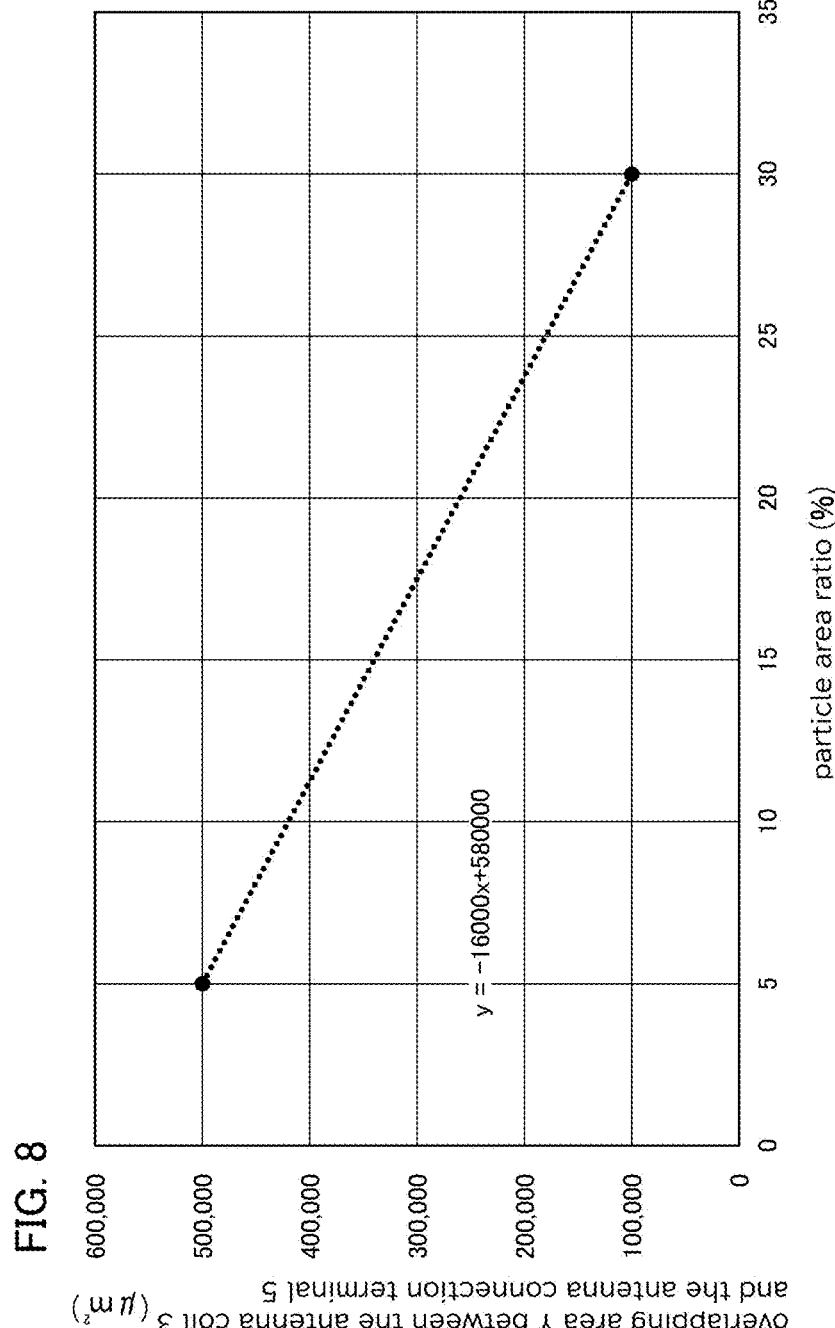
FIG. 8 is a graph showing the relationship between the overlapping area Y shared by the antenna connection terminal and the antenna coil and the particle area ratio X, which is the area ratio of the total area of the conductive particles within the area of the conductive adhesive.

As shown in FIGS. 7 and 8, it is preferable that the overlapping area Y shared by the antenna connection terminal 5 and the antenna coil 3, and the particle area ratio X, which is the area ratio of the total area of the conductive particles 8 within the area of the conductive adhesive 9, satisfy the following relationship:

$$Y(\mu m^2) \geq -16{,}000X + 580{,}000,$$

and $$X\,(\%) =$$

$$(\text{total particle area }(mm^2)/\text{conductive adhesive area }(mm^2)) \times 100.$$

In the case of an overlapping area Y with a value of 580,000 μm² or more that deviates from the straight line in FIG. 8, the relationship will be satisfied even if the particle area is zero in the calculation, but of course this is not the case, and it is preferable to select the conductive adhesive 9 with a particle area ratio of at least 3.0%.

As described later, the conductive adhesive 9 is supplied onto the antenna coil 3 in the second recess 21 in the form of a conductive adhesive film or conductive adhesive paste. The ratio of the total area of the conductive particles 8 to the area of the conductive adhesive 9 supplied in this second recess 21 is defined as the particle area ratio X (%). By setting the overlapping area Y (μm²) between the antenna connection terminal 5 and the antenna coil 3 to have the above relationship, even when taking into account the flow of conductive particles 8 when connecting the IC chip module 4, the number of trapped conductive particles 8 by the antenna connection terminal 5 and the antenna coil 3 can be made to be 5 or more with a probability of Ave-3σ.

Conductive Adhesive

The conductive adhesive 9 contains at least the binder resin 7 and the conductive particles 8, and may also contain other components as necessary. The conductive adhesive 9 is interposed between the IC chip module 4 and the antenna coil 3 exposed in the accommodating recess 6, and electrically connects the antenna connection terminal 5 and the antenna coil 3. The conductive adhesive 9 also adheres the IC chip module 4 to the accommodating recess 6.

Figure 9:
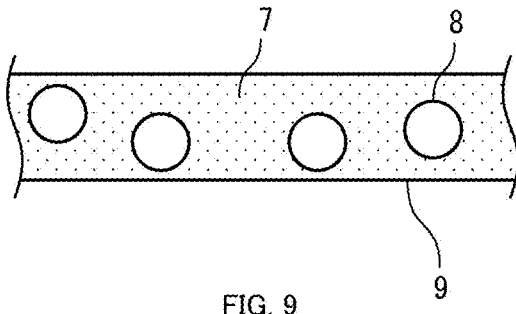
FIG. 9 is a cross-sectional view of the conductive adhesive formed in film form.

The conductive adhesive 9 may be in the form of a film or a paste, but for improved processability it is preferable to be in the form of a film as shown in FIG. 9. In other words, it may be a conductive adhesive film.

There are no particular restrictions on the binder resin 7, and it can be selected appropriately according to the purpose, e.g., crystalline resin and amorphous resin. There are no particular restrictions on the crystalline resin and amorphous resin, and it can be selected appropriately according to the purpose, e.g., phenoxy resin, polyester resin, acryl resin, epoxy resin, urethane resin, and polyamide resin.

It is preferable that the binder resin 7 contain only crystalline resin in consideration of stability at room temperature and ability to bond at low temperatures in a short time.

There are no particular restrictions on the amount of binder resin 7 contained in the conductive adhesive 9, and it can be selected appropriately according to the purpose.

There are no particular restrictions on the material of the conductive particles 8, and it can be selected appropriately according to the purpose, and examples include copper, iron, nickel, gold, silver, aluminum, zinc, stainless steel, and magnetic metal particles such as hematite ($Fe_2O_3$), and magnetite ($Fe_3O_4$). In addition, the conductive particles 8 may be a particles with magnetic metals plated on resin cores such as acryl resin, acrylonitrile-styrene (AS) resin, benzoguanamine resin, divinylbenzene resin, styrene resin, and the like or an inorganic core particle such as silver-plated copper particle. The conductive particles 8 may also be coated with a metal plating film, such as Ag plating, Ni/Au plating, Ni/Pd plating, or Ni/Pd/Au plating. These conductive particles may be used individually or in combination.

The conductive particles 8 may also be solder particles. In the case of solder particles, there are no particular restrictions on whether the alloy is eutectic or non-eutectic, but it is preferable that the alloy contains two or more elements selected from the group consisting of Sn, Bi, Ag, In, Cu, Sb, Pb, and Zn.

There are no particular restrictions on the average particle diameter of the conductive particles 8, and it can be selected appropriately according to the purpose, but for example, it is preferably 20 μm to 50 μm, and more preferably, 30 μm to 40 μm, in order to correspond to the cutting level difference that occurs when the antenna coil 3 is cut. There are no particular restrictions on the content of conductive particles 8 in the conductive adhesive 9, and it can be selected appropriately according to the purpose, e.g., 3.0 wt % to 80 wt %, and more preferably 5.0 wt % to 65 wt %. Furthermore, there are no particular restrictions on the thickness of the conductive adhesive 9, and it can be selected appropriately according to the purpose, e.g., 20 μm to 60 μm, and more preferably, 30 μm to 50 μm.

Smart Card Manufacturing Process

Next, a smart card manufacturing process will be explained. The smart card manufacturing process includes a step of preparing a card body 2 with an antenna coil 3 built in and an IC chip module 4 provided with an antenna connection terminal 5 for conductive connection with the antenna coil 3, the IC chip module 4 to be housed in an accommodating recess 6 in the card body 2; a step of housing the IC chip module 4 in the accommodating recess 6 via a conductive adhesive 9 in which conductive particles 8 are blended with binder resin 7; and a step of heating and pressing the IC chip module 4 to fix the IC chip module 4 in the accommodating recess 6 and conductively connect the antenna coil 3 and the antenna connection terminal 5.

As described above, the card body 2 is a laminate that has the inlay 11 with the antenna coil 3, the first and second core sheet 13*a*, 13*b* laminated appropriately on both sides of the inlay 11, and the overlay 12 that constitutes the front and back surfaces of the card body 2. Each layer that constitutes the card body 2 may be a single layer or laminated multiple layers. The following explanation uses an example of the card body 2 having a three-layer laminate consisting of the inlay 11 with the antenna coil formed therein and the first and second core sheets 13*a*, 13*b* laminated on the front and back surfaces of the inlay 11, and overlays 12 laminated on the front and back surfaces of the laminate.

Figure 10:
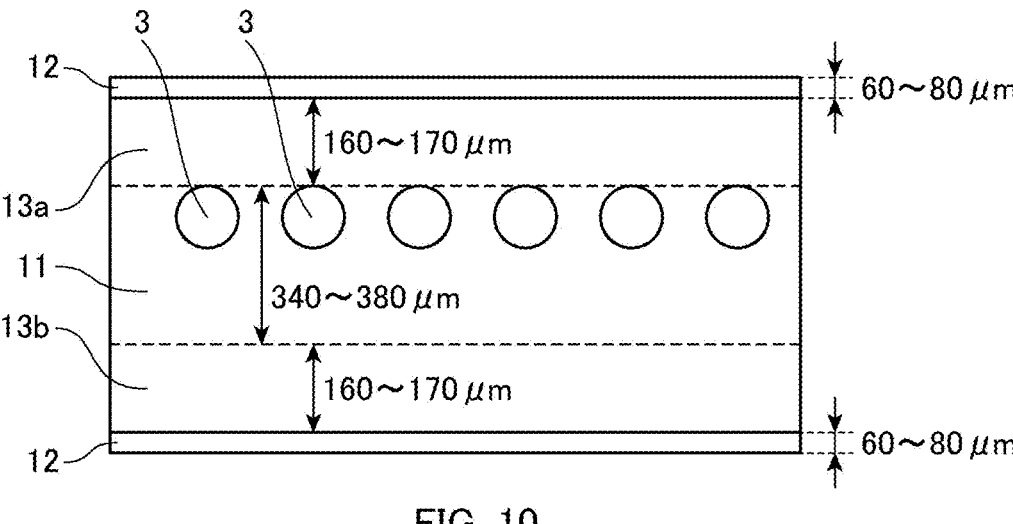
FIG. 10 is a cross-sectional view of a card body, with overlays attached to the surface of the first and second core sheets, which are laminated to both sides of the inlay.

As shown in FIG. 10, the card body 2 is formed by pasting the overlay 12 onto the front surface of the first core sheet 13*a* laminated to the front surface of the inlay 11 and the front surface of the second core sheet 13*b* laminated to the back surface of the inlay 11. The inlay 11 and the first and second core sheets 13*a*, 13*b*, and the first and second core sheets 13*a*, 13*b* and the overlay 12 are laminated via an adhesive layer not shown in the figure. Alternatively, the inlay 11 and the first and second core sheets 13*a*, 13*b*, and the first and second core sheets 13*a*, 13*b* and the overlay 12 may be laminated by being heated and pressed without using an adhesive. Before being laminated with the overlay 12, the first and second core sheets 13*a*, 13*b* are appropriately processed by printing, embossing, and the like.

In the inlay 11, the antenna coil 3 made of a Cu wire and the like that wraps around the circumference of the substrate several times is embedded in the surface layer of a resin substrate, such as polyvinyl chloride (PVC). The first and second core sheets 13*a*, 13*b* are made of the same type of resin substrate as the inlay 11, for example polyvinyl chloride (PVC).

There is no particular restrictions on the thickness of the inlay 11, which can be, e.g., 340 to 380 μm. There are also no particular restrictions on the thickness of the first and second core sheets 13*a*, 13*b*, which can be, e.g., 160 to 170 μm each. There are also no particular restrictions on the thickness of the overlay 12 laminated to the first and second core sheets 13*a*, 13*b*, which can be, e.g., 60 to 80 μm each.

Figure 11:
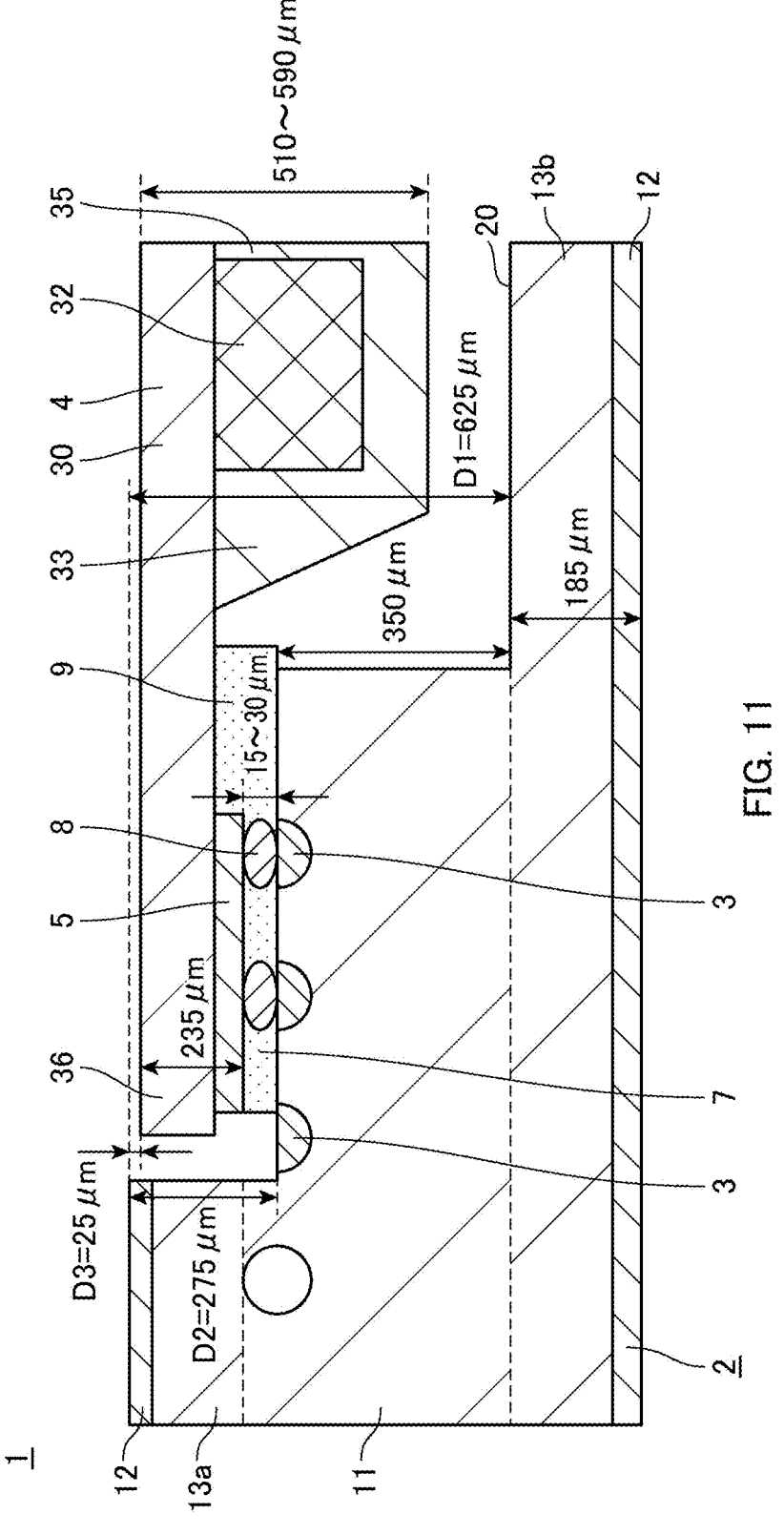
FIG. 11 is a cross-sectional view illustrating dimensional examples of the card body and the IC chip module.

As shown in FIG. 11, the first recess 20 accommodating the resin mold portion 35 of the IC chip module 4 and the second recess 21 accommodating the terminal portion 36 of the IC chip module 4 are formed in the card body 2 by cutting with a NC-controlled milling machine or the like.

The depth D1 of the first recess 20 is determined by taking into account the thickness of the resin mold portion 35 of the IC chip module 4, so that when the card body 2 is bent, the bottom surface of the first recess 20 does not come into contact with the resin mold portion 35 to push up it in the direction of peeling off from the accommodating recess 6, as well as by taking into account the need to ensure strength by leaving a certain amount (100 μm or more, preferably 150 μm or more) of the thickness of the second core sheet 13*b* and the overlay 12 remaining at the bottom of the first recess 20.

The depth D2 of the second recess is set by taking into account the thickness of the terminal portion 36 of the IC chip module 4 and the thickness of the conductive adhesive 9 after adhesion, so that when the IC chip module 4 is fixed to the card body 2, the level difference D3 between the front surface of the IC chip module 4 and the front surface of the card body 2 is within the range of −100 to 50 μm.

In the example shown in FIG. 11, the depth D1 of the first recess 20 is 625 μm, assuming that the thickness of the resin mold portion 35 of the IC chip module 4 is 510 to 590 μm and the thickness of the second core sheet 13*b* and the overlay 12 remaining under the first recess 20 is 150 μm or more in order to maintain the strength of the card body 2. In addition, the depth D2 of the second recess 21 is 275 μm, for example, assuming that the thickness of the overlay 12 is 60

μm, the thickness of the terminal portion 36 of the IC chip module 4 is 235 μm (module substrate 30 thickness: 200 μm, antenna connection terminal 5 thickness: 35 μm), and the thickness of the conductive adhesive 9 under the antenna connection terminal 5 is 15 to 30 μm. The level difference D3 between the front surface of the IC chip module 4 and the front surface of the card body 2 is −25 μm. In addition, the total thickness of the second core sheet 13*b* and the overlay 12 under the first recess 20 is 185 μm.

Next, as shown in FIG. 3 (A), the IC chip module 4 is placed in the accommodating recess 6 via the conductive adhesive 9 in which the conductive particles 8 are blended with the binder resin 7. When using a conductive adhesive film as the conductive adhesive 9, the conductive adhesive film is pasted to the second recess 21 or the IC chip module 4, and the IC chip module 4 is placed in the accommodating recess 6.

Figure 12:
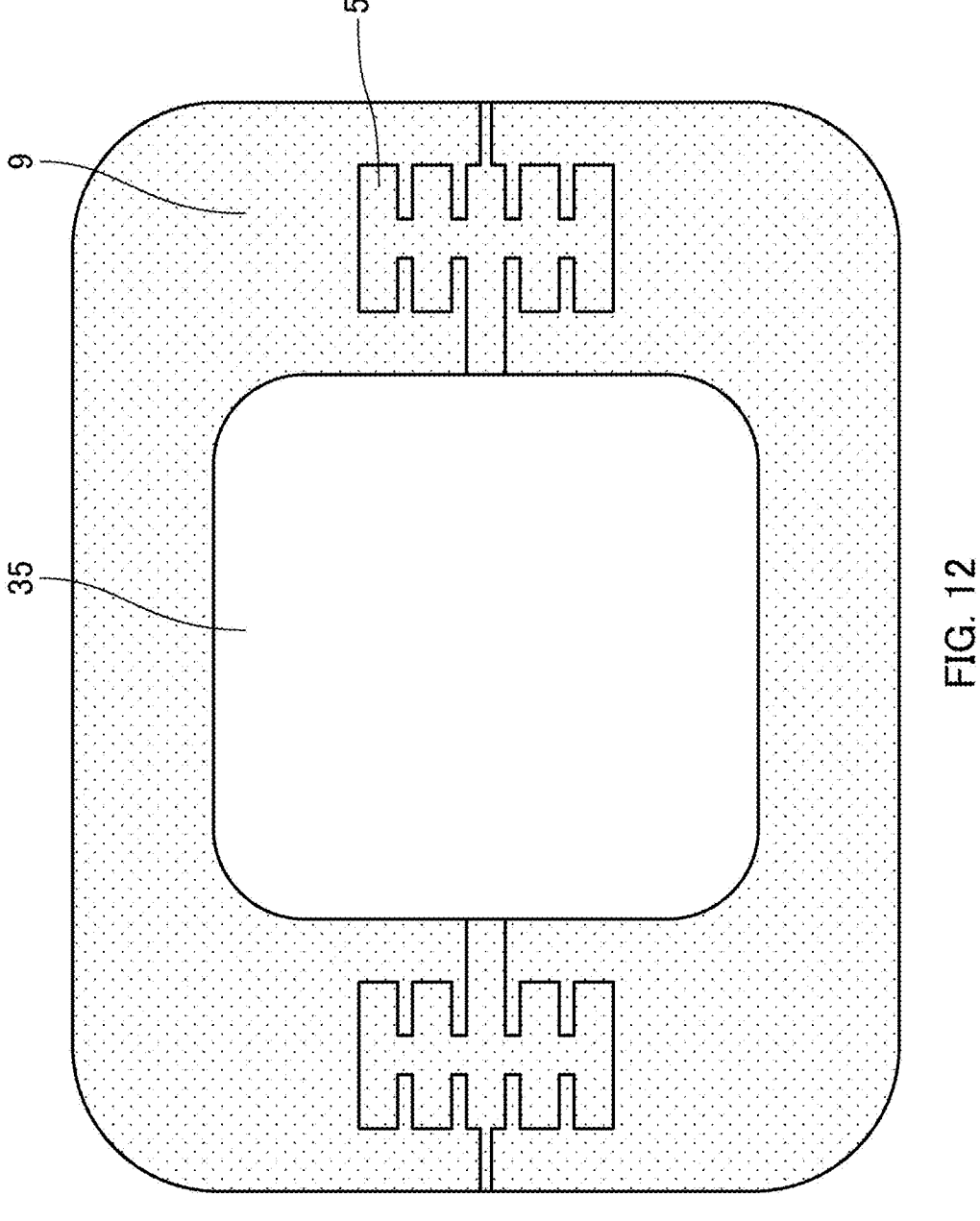
FIG. 12 is a bottom view of the IC chip module with the conductive adhesive film attached, with the part corresponding to the resin mold removed.

When the conductive adhesive film is pasted to the IC chip module 4, the conductive adhesive film is not required for the resin mold portion 35, so the portion corresponding to the resin mold portion 35 can be removed before pasting. FIG. 12 is a bottom view showing the IC chip module 4 with the conductive adhesive film pasted, with the portion corresponding to the resin mold portion 35 removed. It is also possible to paste the film without removing the portion, but in this case, the depth D1 of the first recess 20 is set so that is does not contact the bottom surface of the recess 20 even when the thickness of the conductive adhesive film is added to the thickness of the resin mold portion 35 of the IC chip module 4.

When using conductive adhesive paste as the conductive adhesive 9, the conductive adhesive paste is filled only in the exposed portion of the second recess 21 exposing the antenna coil 3. In addition, an adhesive film containing no conductive particles, from which the portion corresponding to the portion filled with conductive adhesive paste and the resin mold portion 35 is removed, is pasted to the IC chip module 4, and then the IC chip module 4 is housed in the accommodating recess 6.

The IC chip module 4 is then heated and pressed at a predetermined temperature for a predetermined period of time, and the IC chip module 4 is fixed in the accommodating recess 6 while the antenna coil 3 and the antenna connection terminal 5 are conductively connected. The antenna coil 3 and the antenna connection terminal 5 are connected via the conductive particles 8 contained in the conductive adhesive 9 (see FIG. 3 (B)).

In the smart card 1 according to the present technology, the opening 10 having a width larger than the average particle diameter of the conductive particles 8 is formed in the antenna connection terminal 5, so that the flowability of the binder resin 7 can be improved by thermal compression bonding, and it is not necessary to apply high pressure. Therefore, it is possible to prevent deformation of the card body 2. The adhesive force can also be improved by allowing the binder resin 7 to flow into the opening 10 provided in the antenna connection terminal 5.

In such a smart card 1, the adhesive strength of the IC chip module 4 is 50N or more for IC chip modules 4 with a surface area of up to 100 mm$^2$, and 0.5 N/mm$^2$ for IC chip modules 4 with a surface area exceeding 100 mm$^2$.

In addition, by improving the flowability of the binder resin 7, it is possible to sandwich the conductive particles 8 with a uniform thickness in the plane of the antenna coil 3 and the antenna connection terminal 5, thereby improving the particle trapping rate.

11

EXAMPLES

Next, examples of the present technology will be explained. In these examples, an IC chip module with a slit in the antenna connection terminal and an IC chip module without a slit or other opening in the antenna connection terminal were prepared and respectively connected to the accommodating recess in the card body via a conductive adhesive film to fabricate smart cards. Then a bending test and an adhesive strength test were conducted on each smart card.

Fabrication of Smart Card

An anisotropic conductive film (manufactured by DEXERIALS: EH1038-40) containing silver-plated copper particles with an average particle diameter of 38 μm was used as the conductive adhesive to connect the IC chip module to the card body. The anisotropic conductive film with the part overlapping the resin mold portion of the IC chip module removed was pasted to the entire surface of the IC chip module including the antenna connection terminal facing the second recess. This IC chip module was housed in the accommodating recess in the card body, and the smart card was prepared by thermocompression-bonding the IC chip module three times at 215° C.-1.0 s.

Bending Test

In accordance with ISO 10373-1 5.8, the smart cards in the examples and comparative examples were subjected to cyclic bending force in the specified strength and direction. Then the Q value was measured using a resonance frequency checker MP300CL3 (manufactured by Micropross) for the smart cards after 4,000 cycles of bending. If the Q value decreased by 20% or more, the evaluation was "B (bad)", and if it did not decrease by 20% or more, the evaluation was "G (good)".

Adhesive Strength Test

Figure 13:
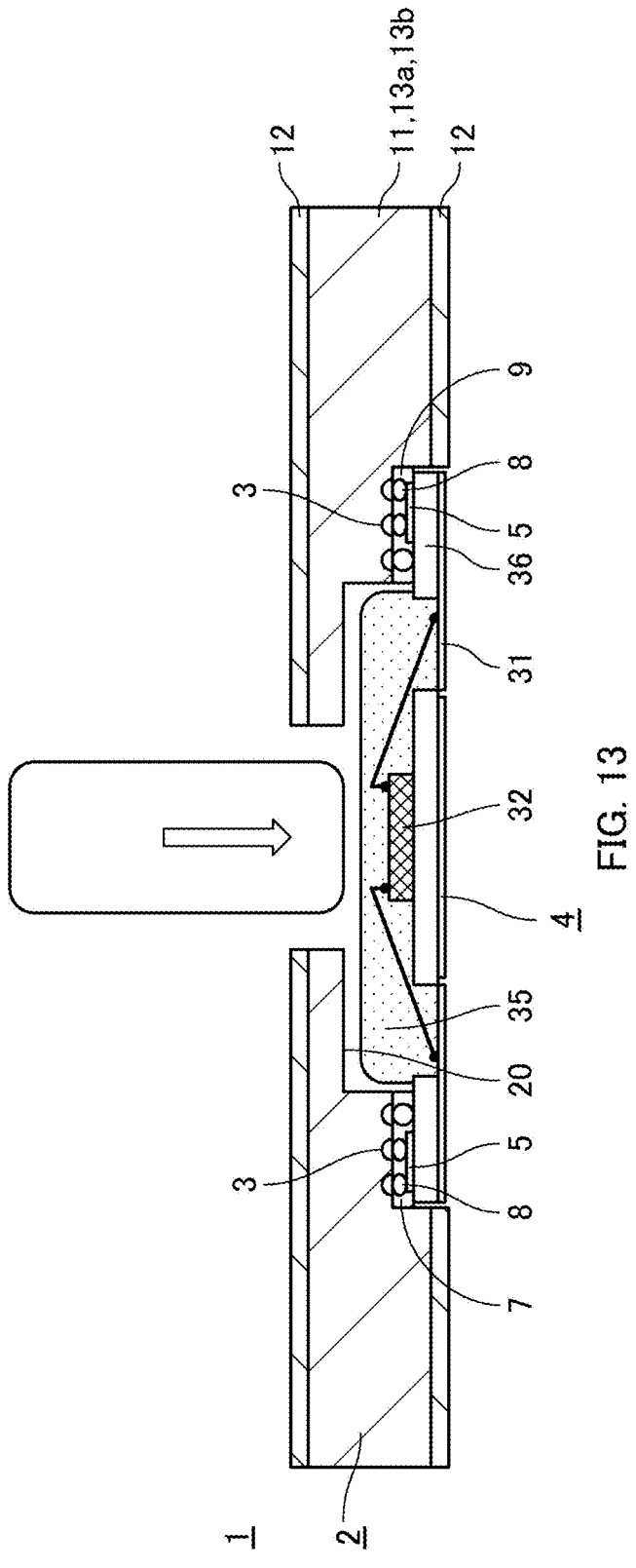
FIG. 13 is a cross-sectional view illustrating a method of conducting an adhesive strength test on the smart card in an example.

A hole was made in the back surface of the smart card in the examples and comparative examples, and the adhesive strength was determined as the peak intensity when the back surface was peeled off at 30 mm/min using a 5 mm diameter metal rod (see FIG. 13).

Example 1

In Example 1, an IC chip module with a slit formed in the antenna connection terminal was used. As shown in FIG. 4, the antenna connection terminal had a rectangular shape with a width of 1.5 mm and a length of 2.6 mm, and four slits with a width of 0.15 mm and a length of 0.55 mm were formed in a symmetrical pattern at intervals of 0.4 mm in the longitudinal direction on both the left and right sides. A smart card was prepared by thermocompression-bonding the IC chip module three times at 215° C.-1.5 bar-1.0 s, i.e., with a pressing force of 1.5 bar.

Example 2

In Example 2, a smart card was prepared by thermocompression-bonding the IC chip module three times at 215° C.-2.5 bar-1.0 s, i.e., with a pressing force of 2.5 bar. The other conditions were the same as in Example 1.

Comparative Example 1

In Comparative Example 1, an IC chip module was used that did not have a slit formed in the antenna connection terminal. The antenna connection terminal had a rectangular shape with a width of 1.5 mm and a length of 2.6 mm, as

Figure 14:
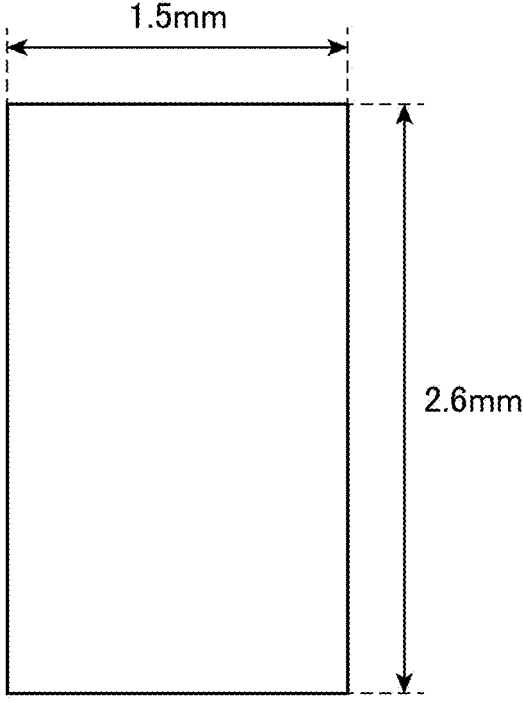
FIG. 14 is a plan view of the antenna connection terminal in a comparative example.
Figure 15:
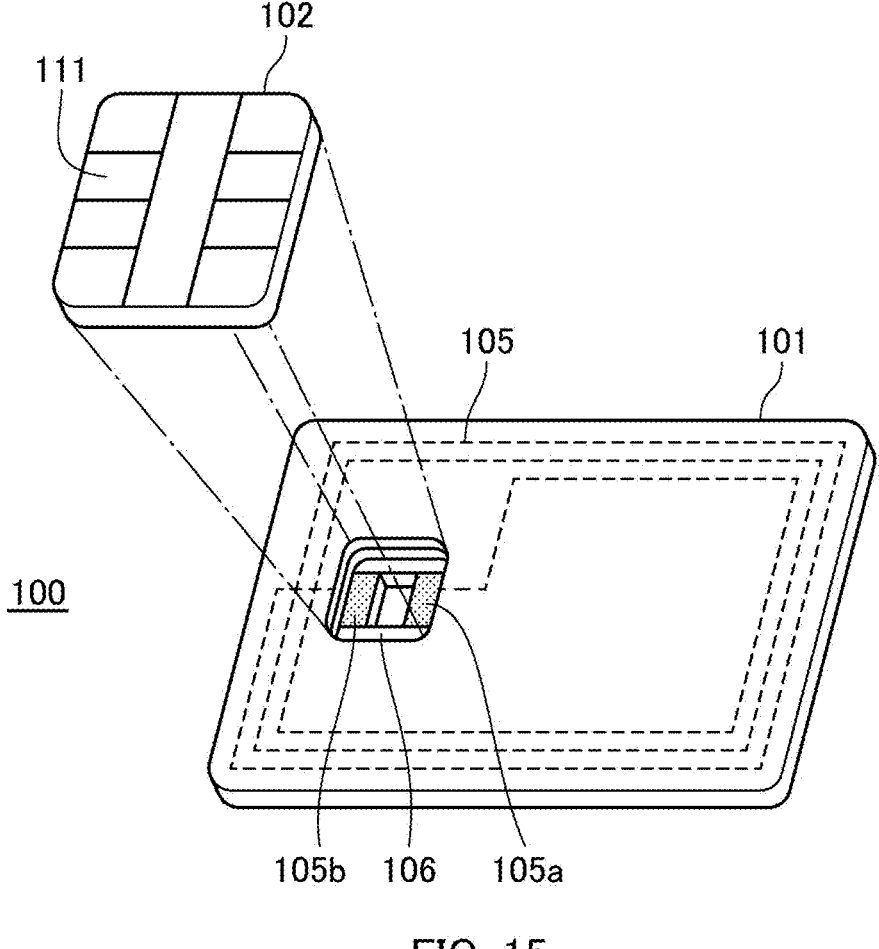
FIG. 15 is a disassembled perspective view of a configuration example of the structure of a contact/non-contact combined type smart card.
Figure 16:
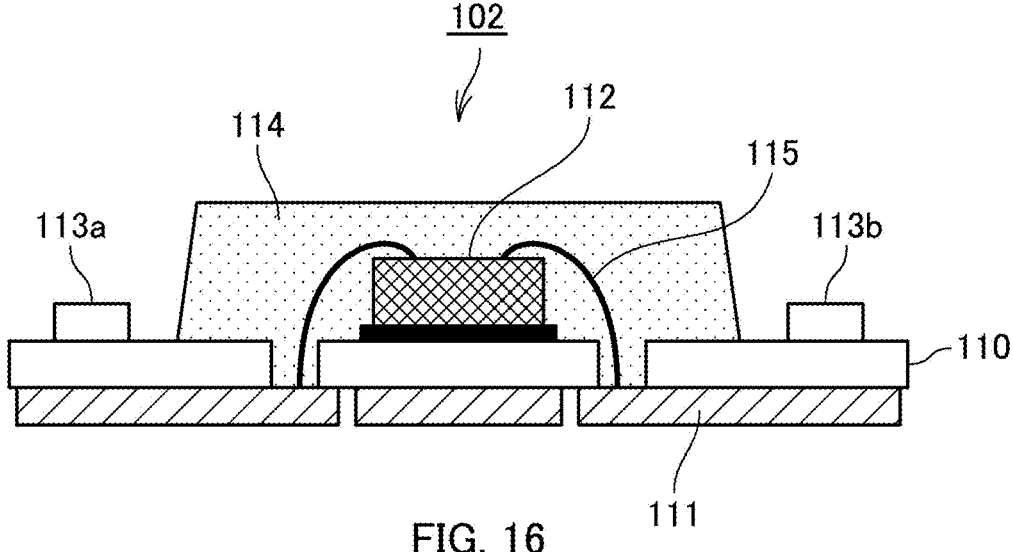
FIG. 16 is a cross-sectional view of the IC chip module for both contact and non-contact applications.

12 shown in FIG. 14, and no slit was formed. In addition, a smart card was prepared by thermocompression-bonding the IC chip module three times at 215° C.-2.5 bar-1.0 s, i.e., with a pressing force of 2.5 bar.

Comparative Example 2

In Comparative Example 2, a smart card was prepared by thermocompression-bonding the IC chip module three times at 215° C.-1.5 bar-1.0 s, i.e., with a pressing force of 1.5 bar. The other conditions were the same as Comparative Example 1.

TABLE 1

| | | EX. 1 | EX. 2 | Comp. 1 | Comp. 2 |
|---|---|---|---|---|---|
| antenna connection terminal (2.6 × 1.5 mm) | with slit | ✓ | ✓ | | |
| | without slit | | | ✓ | ✓ |
| pressure 2.5 bar | | | ✓ | ✓ | |
| pressure 1.5 bar | | ✓ | | | ✓ |
| evaluation of binding test | | G | G | G | B |
| adhesive strength(N) | | 115 | 120 | 110 | 105 |

As shown in Table 1, in Example 1, in which the slits were formed in the antenna connection terminal, good adhesive strength was obtained even under low pressure of 1.5 bar. In Example 2, where the pressing force was set at 2.5 bar, there was a further improvement in adhesive strength. In addition, in all of the examples, the results of the bending test were "G (good)". This shows that by forming slits in the antenna connection terminal, the flowability of the conductive adhesive is improved, and high adhesive strength can be achieved even under low pressure.

On the other hand, in Comparative Example 1, where no slit was formed in the antenna connection terminal, even at a pressing force of 2.5 bar, the adhesive strength was lower than in Example 1, where the pressing force was lower. In addition, in the Comparative Example 2, where the pressing force was 1.5 bar, there was a greater decrease in the adhesive strength, and the bending test evaluation was B (bad).

REFERENCE SIGNS LIST 1 smart card, 2 card body, 3 antenna coil, 4 IC chip module, 5 antenna connection terminal, 6 accommodating recess, 7 binder resin, 8 conductive particles, 9 conductive adhesive, 10 opening, 10a slit, 10b hole, 11 inlay, 12 overlay, 13a first core sheet, 13b second core sheet, 20 first recess, 21 second recess, 30 module substrate, 31 contact terminal, 32 IC chip, 33 encapsulating resin, 35 resin mold portion, 36 terminal portion

The invention claimed is:

1. A smart card, comprising:

a card body with an antenna coil built in; and an IC chip module comprising an antenna connection terminal for conductive connection with the antenna coil, the IC chip module being housed in an accommodating recess in the card body, wherein the antenna coil and the antenna connection terminal are conductively connected via a conductive adhesive in which conductive particles are blended with binder resin, and the antenna connection terminal has an opening with a width larger than the average particle diameter of the conductive particles.

2. The smart card according to claim 1, wherein the opening is a slit and/or a hole.

3. The smart card according to claim 1, wherein a longitudinal direction of the opening is different from a wiring direction of the antenna coil.

4. The smart card according to claim 1, wherein a pattern of the opening is a symmetrical pattern in plan view of the antenna connection terminal.

5. The smart card according to claim 1, wherein the width of the opening is 100 μm or more and 300 μm or less.

6. The smart card according to claim 1, wherein an overlapping area Y shared by the antenna connection terminal and the antenna coil, and a particle area ratio X, which is the area ratio of the total area of the conductive particles within the area of the conductive adhesive, satisfy the following relationship:

$$Y\left(\mu m^2\right) \geq -16{,}000X + 580{,}000,$$

and $$X\left(\%\right) =$$

$$\left(\text{total particle area}\left(mm^2\right) \middle/ \text{conductive adhesive area}\left(mm^2\right)\right) \times 100.$$

7. The smart card according to claim 6 that also satisfies the following condition:

$$X\left(\%\right) \geq 3.0.$$

8. A method for manufacturing a smart card, comprising:

a step of preparing a card body with an antenna coil built in, and an IC chip module provided with an antenna connection terminal for conductive connection with the antenna coil, the IC chip module to be housed in an accommodating recess in the card body;

a step of housing the IC chip module in the accommodating recess via a conductive adhesive in which conductive particles are blended with binder resin; and a step of heating and pressing the IC chip module to fix the IC chip module in the accommodating recess and conductively connect the antenna coil and the antenna connection terminal, wherein the antenna connection terminal has an opening with a width larger than the average particle diameter of the conductive particles.

9. A method for manufacturing a smart card according to claim 8, wherein the conductive adhesive film is a film which is laminated to the IC chip module, and then the IC chip module is housed in the accommodating recess.

* * * * *